United States Patent
Chicurel

(10) Patent No.: US 10,066,372 B2
(45) Date of Patent: Sep. 4, 2018

(54) ECONOMIZER SYSTEM AND METHOD FOR SAVING HEAT AND WATER

(71) Applicant: Ricardo Chicurel, Mexico City (MX)

(72) Inventor: Ricardo Chicurel, Mexico City (MX)

( * ) Notice: Subject to any disclaimer, the term of this patent is extended or adjusted under 35 U.S.C. 154(b) by 0 days.

(21) Appl. No.: 15/353,258

(22) Filed: Nov. 16, 2016

(65) Prior Publication Data

US 2017/0138020 A1    May 18, 2017

Related U.S. Application Data

(60) Provisional application No. 62/255,861, filed on Nov. 16, 2015.

(51) Int. Cl.
| | | |
|---|---|---|
| *E03C 1/00* | (2006.01) | |
| *F16K 31/00* | (2006.01) | |
| *E03B 1/04* | (2006.01) | |
| *F24H 9/12* | (2006.01) | |
| *E03B 7/04* | (2006.01) | |

(52) U.S. Cl.
CPC .............. *E03B 1/048* (2013.01); *E03B 7/045* (2013.01); *F24H 9/126* (2013.01); *Y02A 20/411* (2018.01)

(58) Field of Classification Search
CPC .......... E03B 1/048; E03B 7/045; F24H 9/126; F24D 17/0078; F24D 19/1051
USPC ...................................... 4/668, 597; 137/337
See application file for complete search history.

(56) References Cited

U.S. PATENT DOCUMENTS

| | | | | |
|---|---|---|---|---|
| 3,933,636 A | * | 1/1976 | Daniels | B60R 15/04 210/104 |
| 4,162,218 A | * | 7/1979 | McCormick | C02F 1/006 137/386 |
| 4,372,372 A | | 2/1983 | Hunter | |
| 4,893,364 A | * | 1/1990 | Keeler | E03C 1/00 137/393 |
| 4,924,536 A | * | 5/1990 | Houghton | E03B 1/04 4/415 |
| 5,165,456 A | * | 11/1992 | Woolman | E03C 1/023 141/98 |
| 5,287,570 A | * | 2/1994 | Peterson | E03C 1/052 4/625 |
| 5,564,462 A | * | 10/1996 | Storch | F24D 17/0078 122/13.3 |
| 6,032,687 A | * | 3/2000 | Linn | E03B 1/04 137/337 |
| 6,098,213 A | * | 8/2000 | Chu | E03B 1/04 137/334 |
| 6,243,891 B1 | * | 6/2001 | Nickerson | E03C 1/01 4/597 |
| 8,656,526 B2 | | 2/2014 | Brewin | |
| 2008/0141455 A1 | * | 6/2008 | Harrison | E03B 1/04 4/665 |

(Continued)

*Primary Examiner* — Benjamin R Shaw
(74) *Attorney, Agent, or Firm* — Lucas & Mercanti, LLP

(57) ABSTRACT

An economizer system and method for saving heat and water, comprising a bathing facility for receiving hot water from a water heater through a pipeline; a first valve for controlling the flow of hot water received by the bathing facility; a second valve for allowing the flow of an initial volume of cold water existing in the pipeline between the water heater and the bathing facility 1 through a filling line; and a holding tank for collecting the initial volume of cold water flowing from the filling line before the hot water is delivered to the bathing facility.

16 Claims, 5 Drawing Sheets

(56) References Cited

U.S. PATENT DOCUMENTS

| | | | |
|---|---|---|---|
| 2008/0196156 A1* | 8/2008 | Brewin | E03C 1/00 4/597 |
| 2009/0211644 A1* | 8/2009 | Wylie | F24D 17/0078 137/2 |
| 2009/0293961 A1* | 12/2009 | McMurtry | E03B 1/048 137/337 |
| 2012/0118414 A1* | 5/2012 | McMurtry | E03B 1/048 137/605 |
| 2013/0048104 A1* | 2/2013 | Li | E03B 1/048 137/386 |
| 2013/0061944 A1* | 3/2013 | Tarantino | E03B 1/042 137/101.27 |
| 2013/0205493 A1* | 8/2013 | Vigneron | E03B 1/04 4/596 |
| 2015/0185737 A1* | 7/2015 | Yeh | G05D 9/02 137/409 |
| 2016/0084509 A1* | 3/2016 | Huts | F24D 17/0078 122/13.3 |

* cited by examiner

ECONOMIZER SYSTEM AND METHOD FOR SAVING HEAT AND WATER

RELATED APPLICATION

This application claims the benefit of priority of U.S. Provisional Patent Application Ser. No. 62/255,861, filed on Nov. 16, 2015, the contents of which is incorporated herein by reference.

FIELD OF THE INVENTION

The present invention refers to an economizer system and method for saving heat and water, especially designed for reducing the residential use of heat energy and water of bathing facilities, such as showers or bathtubs.

BACKGROUND OF THE INVENTION

A common practice in the preparation of a shower or tub bath, is to open the hot water valve to purge the cold water in the line coming from a water heater. In this manner, a volume of water approximately equal to the volume contained in that line is wasted as it flows out into a drain. Furthermore, as the hot water valve is shut at the end of the bath, the hot water remaining in said line begins to cool, often losing most of the sensible heat it had originally gained in the water heater.

In an attempt to avoid the waste of water, users sometimes place a container, such as a pail, to collect the purged water for some appropriate later use instead of letting it go down the drain. Besides the chore involved in doing this, the waste of heat is not eliminated.

U.S. Pat. No. 4,372,372 discloses a shower bath economizer to effect an energy saving by transferring heat from the spent shower bath water to the cold water supplied to the shower bath closet. To this end, it is provided a heat exchanger in the outlet line of the spent water leaving the shower bath closet, through which the incoming cold inlet water is directed, thereby raising its temperature prior to entry into the shower bath closet. Although the water heater needs to supply less hot water, there is still an initial volume of cold water existing in the pipeline between the water heater and the shower bath closet wasted as it flows out into the drain.

U.S. Pat. No. 8,656,526 discloses a recirculating shower system to recycle part of the used water in a shower. The system is provided with a heater for heating the recycled water to a temperature at which microorganisms are killed, and a heat exchanger arranged to exchange heat between the water flowing towards and away from the heater, thereby reducing the heating load on the heater. A hydrocyclone is needed to separate the used water into a clean water portion and a waste water portion. The clean water portion is returned directly back into the circuit for recirculation, whereas the waste water portion is directed to a waste water pipe.

SUMMARY OF THE INVENTION

The present invention refers to an economizer system and method for reducing heat and water losses when using a shower or bathtub for bathing, in which an initial volume of cold water existing in the pipeline between a water heater and the bathing facility is firstly collected in a holding tank. Once the bath is finished, the collected water is pumped back into the pipeline forcing the still hot water in it to return to the water heater, displacing at the same time an equal volume of cold water in the bottom of the water heater out into the supply pipeline.

In accordance with one aspect of the present invention there is provided an economizer system for saving heat and water, comprising a bathing facility for receiving hot water from a water heater through a pipeline, a first valve for controlling the flow of hot water received by the bathing facility, a second valve for allowing the flow of an initial volume of cold water existing in the pipeline between the water heater and the bathing facility through a filling line, and a holding tank for automatically collecting the initial volume of cold water flowing from the filling line before the hot water is delivered to the bathing facility.

The bathing facility is preferably a shower, bathtub, a combination thereof, or any other similar installation, in which the hot water is usually delivered by means of a shower head, faucet, or similar device. Preferably, the first valve is a manual valve, whereas the second valve is a solenoid valve.

The holding tank must be capable of collecting all the initial volume of cold water existing in the pipeline between the water heater and the bathing facility. Thus, the cold water contained in the pipeline is collected in the holding tank, before delivering the hot water to the bathing facility. In this way, there is no need to purge the cold water existing in the pipeline, and therefore, no water is wasted flowing out into the drain in the preparation of the bath.

Preferably, the holding tank comprises a vent to the atmosphere, a first sensor for detecting when the water level in the holding tank reaches its maximum or highest point, and a second sensor for detecting when the water level in the holding tank reaches its minimum or lowest point.

In a preferred embodiment of the present invention, the economizer system further comprises a pump, driven by a motor, for pumping back into the pipeline the initial volume of cold water collected in the holding tank through a discharge line, once the bath is finished. The discharge line is provided with a check valve, also known as non-return valve or one-way valve, for allowing the flow of the initial volume of cold water discharged by the pump only in the direction in which the pump discharges.

In order to facilitate the control to the user, the economizer system comprises a control box having a display which constitutes a user interface. Preferably, the control box is formed by a start button and a reset button, constituting the user inputs. The start button is intended for opening the second valve, allowing the flow of the initial volume of cold water through the filling line until the water level in the holding tank reaches its maximum point. In turn, the reset button is intended for starting the motor of the pump, once the bath is finished, allowing the discharge of the initial volume of cold water into the pipeline until the water level in the holding tank reaches its minimum point.

The control box further comprises a first pilot light, preferably of red color, for signaling a waiting period until the water level in the holding tank reaches its maximum point, and a second pilot light, preferably of green color, for signaling that the bathing facility is ready for delivering hot water. In addition, the control box may incorporate audible signals for assisting the user in the preparation of the bath.

To initiate an operation cycle, the start button is pressed, causing the second valve to open. This results in the flow of an initial volume of cold water contained in the pipeline into the holding tank through the filling line. At the same time the first pilot light is turned on, signaling the beginning of a waiting period while the holding tank fills up. When the level in said holding tank reaches the maximum point, a signal from the first sensor results in the shutting off of the second valve, while at the same time the first pilot light is turned off and the second pilot light is turned on, signaling to the user that the shower is ready for use. In addition, an audible signal of short duration may be incorporated at this time. Once finished bathing and shutting the first valve, the user presses the reset button, causing the motor to start. At the same time, the second pilot light is turned off and the first pilot light turned on. When the water level in the holding tank reaches its minimum point, the second sensor sends a signal causing the motor to stop while at the same time turning off the first pilot light.

During the last phase of the cycle, the flow direction in pipeline is reversed from the usual direction as cold water from holding tank displaces the hot water in pipeline before a significant drop in its temperature occurs. This hot water enters at the top of the water heater displacing an equal volume of cold water from the bottom of the same, which is forced to return to the supply source through the supply pipeline. This prevents the loss of heat of the still hot water remaining in the pipeline once the bath is finished. In turn, the cold water collected in the holding tank returns back to the pipeline between the water heater and the bathing facility. The economizer system is then ready for another cycle of operation.

The supply source must, of course, be capable of receiving this back flow, which in the case of a hydropneumatic water supply system, might require control adjustments, or even an increased tank capacity.

In accordance with a further aspect of the present invention there is provided a method for saving heat and water, comprising the steps of:
a) providing a bathing facility for receiving hot water from a water heater through a pipeline;
b) having a first valve for controlling the flow of hot water received by the bathing facility shut off;
c) opening a second valve for allowing the flow of an initial volume of cold water existing in the pipeline between the water heater and the bathing facility through a filling line;
d) collecting in a holding tank the initial volume of cold water flowing from the filling line; and
e) opening the first valve for delivering the hot water to the bathing facility.
Preferably, the step c) further comprises the steps of:
c1) pressing a start button for opening the second valve; and
c2) signaling a waiting period until the water level in the holding tank reaches its maximum point.
Preferably, the step d) further comprises the steps of:
d1) filling up the holding tank;
d2) detecting when the water level in the holding tank reaches its maximum point;
d3) shutting off the second valve; and
d4) signaling that the bathing facility is ready for delivering hot water.
Preferably, the method further comprises the steps of:
f) shutting off the first valve once the bath is finished; and
g) pumping back into the pipeline the initial volume of cold water collected in the holding tank.
Preferably, the step g) further comprises the steps of:
g1) providing a pump driven by a motor for pumping back into the pipeline the initial volume of cold water collected in the holding tank through a discharge line, wherein the discharge line is provided with a check valve for allowing the flow of the initial volume of cold water discharged by the pump only in the direction in which the pump discharges;
g2) displacing a remaining volume of hot water in the pipeline with the initial volume of cold water discharged by the pump, causing said remaining volume of hot water in the pipeline to enter at the top of the water heater; and
g3) forcing a returning volume of water from the bottom of the water heater, equal to the remaining volume of water entering at the top water heater, to return through a supply pipeline which allows supplying cold water to the bottom of the water heater.
Preferably, the control of the step g) comprises the steps of:
e1) pressing a reset button for starting a motor driving a pump for pumping back into the pipeline the initial volume of cold water collected in the holding tank;
e2) signaling that the bathing facility is not ready for delivering hot water;
e3) discharging the initial volume of cold water collected in the holding tank;
e4) detecting when the water level in the holding tank reaches its minimum point;
e5) stopping the motor; and
e6) signaling that the bathing facility is ready for reinitiating the step c).

BRIEF DESCRIPTION OF THE DRAWINGS

The following is a brief description of a series of drawings which will help understand the invention better and which relate to an embodiment of said invention which is presented as a non-limiting example thereof.

DETAILED DESCRIPTION OF THE INVENTION

Figure 1:
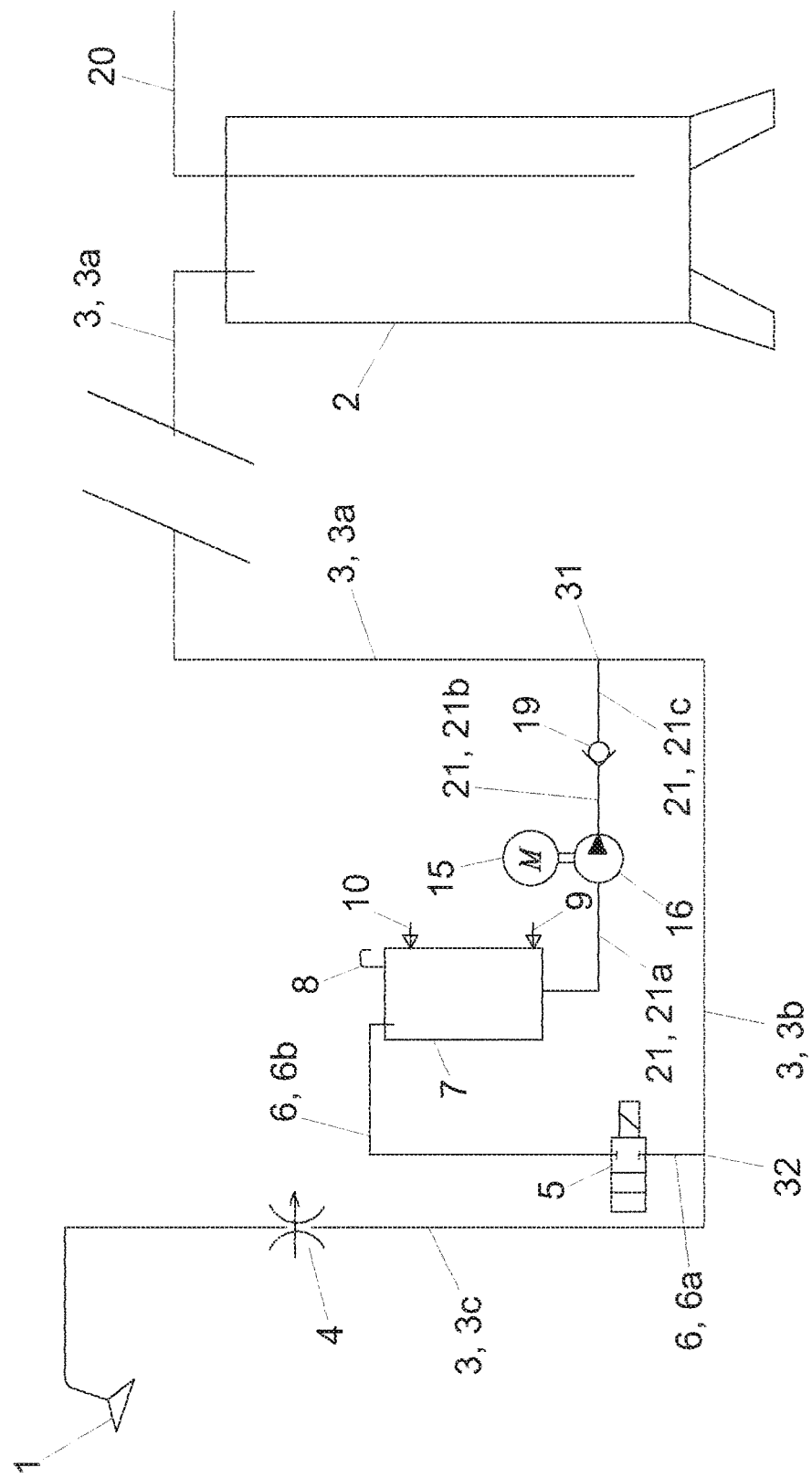
FIG. 1 shows a schematic diagram of the economizer system of the present invention, incorporated in an installation to provide hot water to a shower.

FIG. 1 shows a schematic diagram of the economizer system of the present invention, incorporated in an installation to provide hot water to a bathing facility. For clarity purposes, the installation (pipelines, valves, etc.) for supplying cold water is not shown.

As it can be seen in FIG. 1, the economizer system for saving heat and water of the present invention comprises; a bathing facility 1 for receiving hot water from a water heater 2 through a pipeline 3, a first valve 4 for controlling the flow of hot water received by the bathing facility 1, a second valve 5 for allowing the flow of an initial volume of cold water existing in the pipeline 3 between the water heater 2 and the bathing facility 1 through a filling line 6, and a holding tank 7 for collecting the initial volume of cold water flowing from the filling line 6 before the hot water is delivered to the bathing facility 1.

According to the present embodiment, the bathing facility 1 consists in a shower in which the hot water is delivered by a shower head. The first valve 4 is a manual valve, whereas the second valve 5 is a solenoid valve.

The holding tank 7 comprises a vent 8 to the atmosphere, a first sensor 10 for detecting when the water level in the holding tank 7 reaches its maximum point, and a second sensor 9 for detecting when the water level in the holding tank 7 reaches its minimum point.

The economizer system further comprises a pump 16, driven by a motor 15, for pumping back into the pipeline 3 the initial volume of cold water collected in the holding tank 7 through a discharge line 21, once the bath is finished. In turn, the discharge line 21 is provided with a check valve 19 for allowing the flow of the initial volume of cold water discharged by the pump 16 only in the direction in which the pump 16 discharges.

The hydraulic circuit of the present embodiment is described in more detail below.

The pipeline 3 is formed by a first section 3a extending from the top of the water heater 2 to a first bifurcation 31, a second section 3b extending from the first bifurcation 31 to a second bifurcation 32, and a third section 3c extending from the second bifurcation 32 to the first valve 4. In turn, the filling line 6 is formed by a first part 6a extending from the second bifurcation 32 to the second valve 5, and a second part 6b extending from the second valve 5 to the holding tank 7. The discharge line 21 is formed by a first segment 21a extending from the holding tank 7 to the pump 16, a second segment 21b extending from the pump 16 to the check valve 19, and a third segment 21c extending from the check valve 19 to the first bifurcation 31. Finally, the hydraulic circuit further comprises a supply pipeline 20 for supplying cold water to the bottom of the water heater 2.

Figure 2:
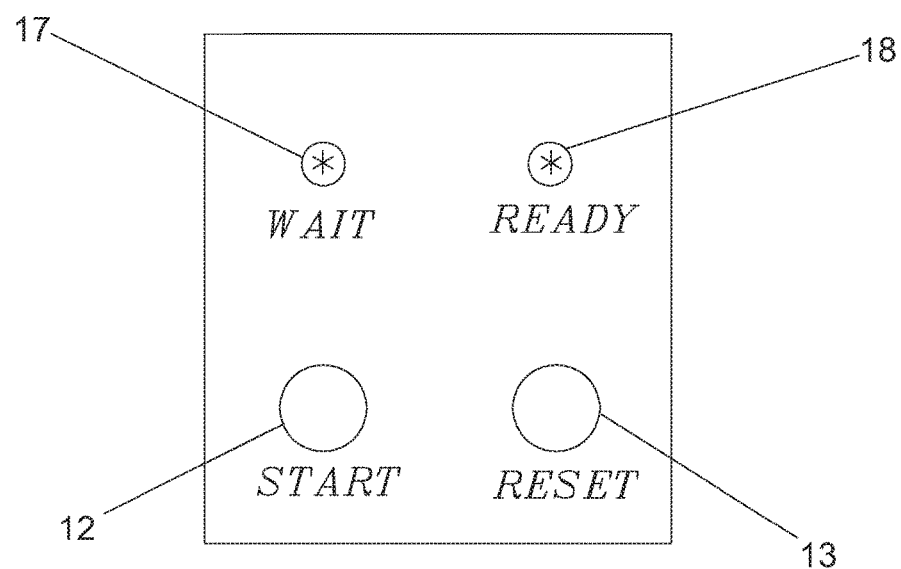
FIG. 2 shows a schematic representation of a control box and display corresponding to the economizer system of FIG. 1.

As it can be seen in FIG. 2, in order to facilitate the control to the user, the economizer system comprises a control box 11 having a display which constitutes a user interface. The control box is formed by a start button 12 and a reset button 13, constituting the user inputs. The start button 12 is intended for opening the second valve 5, allowing the flow of the initial volume of cold water through the filling line 6 until the water level in the holding tank 7 reaches its maximum point. In turn, the reset button 13 is intended for starting the motor 15 of the pump 16, once the bath is finished, allowing the discharge of the initial volume of cold water into the pipeline 3 until the water level in the holding tank 7 reaches its minimum point.

The control box 11 further comprises a first pilot light 17, preferably of red color, for signaling a waiting period until the water level in the holding tank 7 reaches its maximum point, and a second pilot light 18, preferably of green color, for signaling that the bathing facility 1 is ready for delivering hot water. In addition, the control box 11 may incorporate audible signals for assisting the user in the preparation of the bath.

Figure 3A:
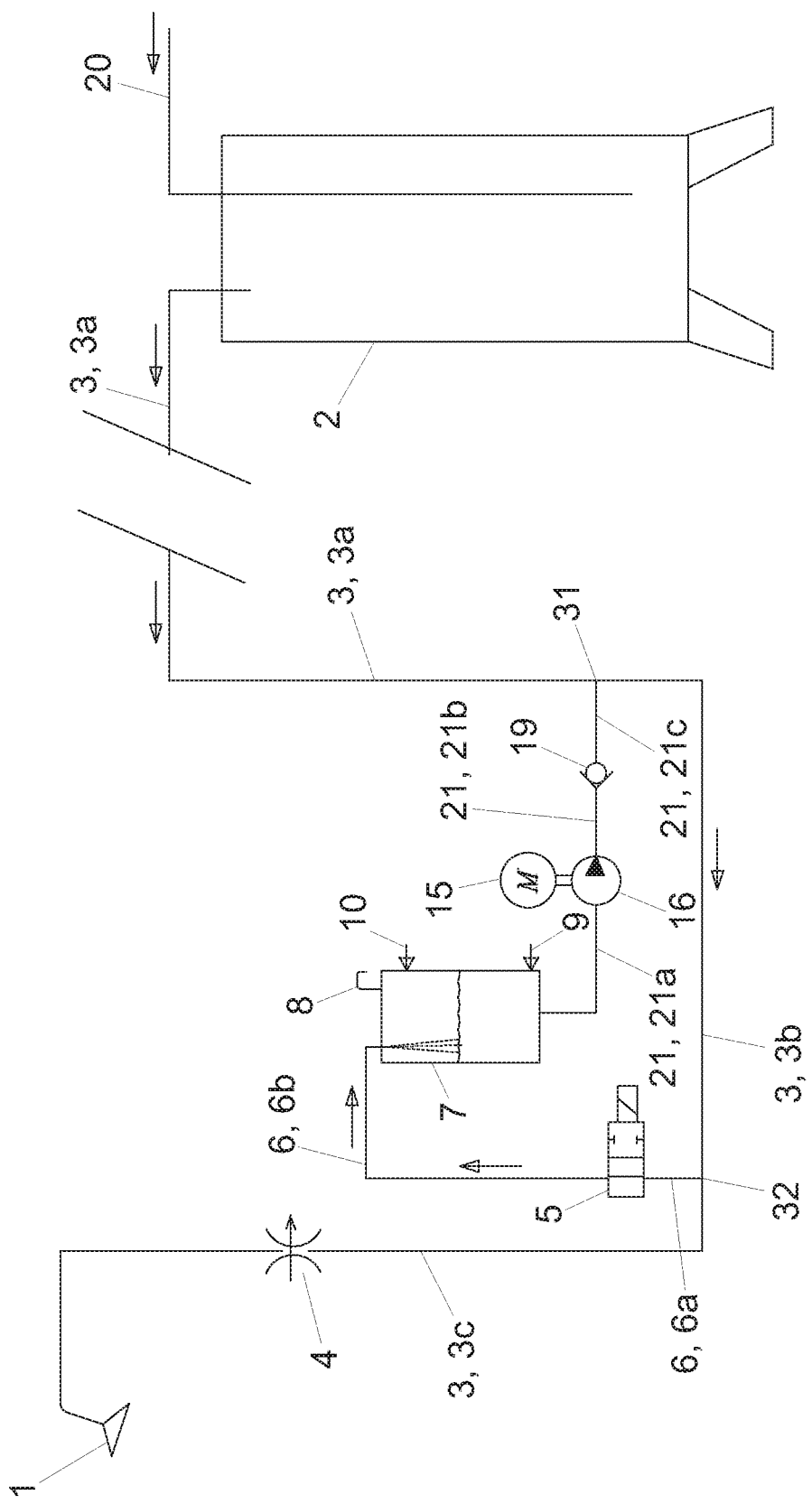
FIG. 3a shows a schematic diagram of the economizer system of FIG. 1 during the initial phase of operation, when the holding tank is being filled.
Figure 3B:
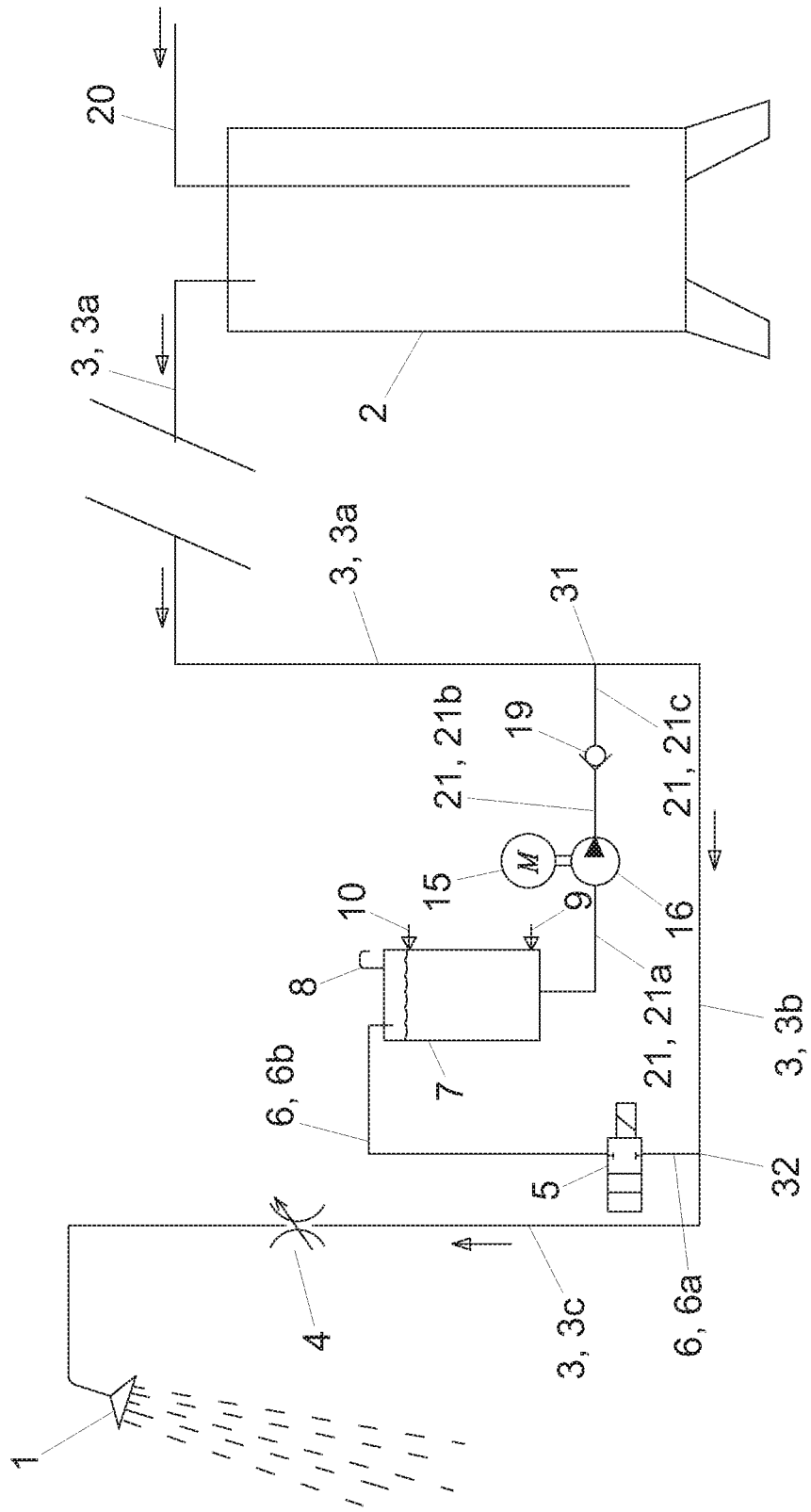
FIG. 3b shows a schematic diagram of the economizer system of FIG. 1 during operation of the shower, when the hot water from the water heater is being delivered to the shower.
Figure 3C:
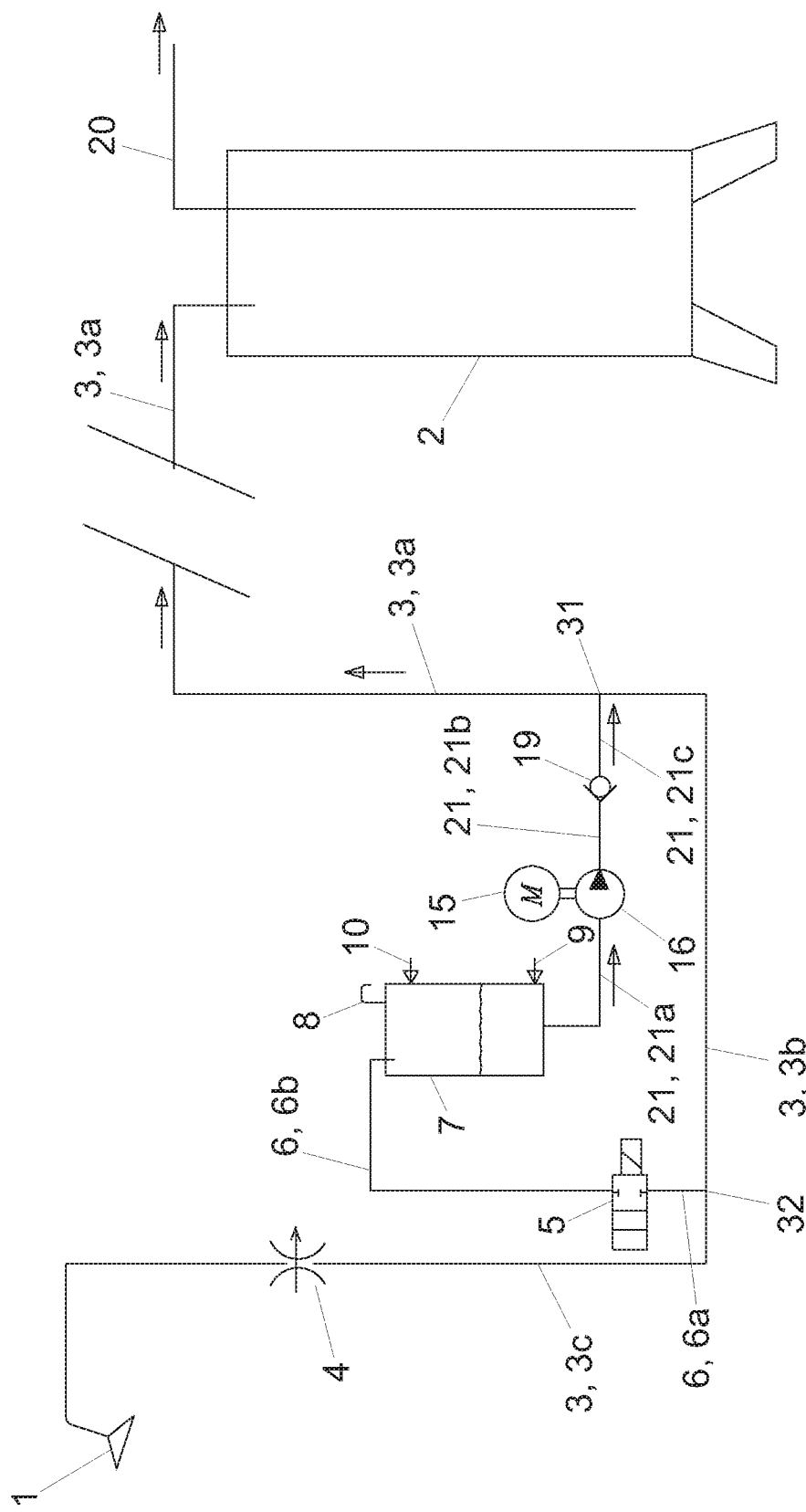
FIG. 3c shows a schematic diagram of the economizer system of FIG. 1 during the final phase of operation, when the water collected in the holding tank is pumped back into the pipeline.

FIGS. 3a, 3b and 3c represent a sequence of the operation cycle. The arrows alongside the pipelines and/or lines indicate the direction of the flow.

As it can be seen in FIG. 3a, to initiate the cycle, the start button 12 is pressed, causing the second valve 5 to open, whereas the first valve 4 is shut off. This results in an initial volume of cold water contained in the pipeline 3 flowing into the holding tank 7 through the filling line 6. At the same time the first pilot light 17 is turned on, signaling the beginning of a waiting period while the holding tank 7 fills up.

As it can be seen in FIG. 3b, when the level in said holding tank 7 reaches the maximum point, a signal from the first sensor 10 results in the shutting off of the second valve 5, while at the same time the first pilot light 17 is turned off and the second pilot light 18 is turned on, signaling to the user that the shower is ready for use. In addition, an audible signal of short duration may be incorporated at this time. The first valve 4 is then opened for immediately delivering hot water to the bathing facility 1, without having to purge previously the cold water existing in the pipeline. Therefore, no water is wasted flowing out into the drain in the preparation of the bath.

As it can be seen in FIG. 3c, once finished bathing and shutting the first valve 4, the user presses the reset button 13, causing the motor 15 to start. At the same time, the second pilot light 18 is turned off and the first pilot light 17 turned on. When the water level in the holding tank 7 reaches its minimum point, the second sensor 9 sends a signal causing the motor 15 to stop while at the same time turning off the first pilot light 17. During this last phase of the cycle, the flow direction in pipeline 3 is reversed from the usual direction as cold water from holding tank 7 displaces the hot water in pipeline 3 before a significant drop in its temperature occurs. This hot water enters at the top of the water heater 2 displacing an equal volume of cold water from the bottom of the same, which is forced to return to the supply source through the supply pipeline 20. This prevents the loss of heat of the still hot water remaining in the pipeline once the bath is finished. In turn, the cold water collected in the holding tank 7 returns back to the pipeline 3 between the water heater 2 and the bathing facility 1. The economizer system is then ready for another cycle of operation.

The method for saving heat and water of the present embodiment comprises the steps of:
a) providing a bathing facility 1 for receiving hot water from a water heater 2 through a pipeline 3;
b) having a first valve 4 for controlling the flow of hot water received by the bathing facility 1 shut off;
c) opening a second valve 5 for allowing the flow of an initial volume of cold water existing in the pipeline 3 between the water heater 2 and the bathing facility 1 through a filling line 6;
d) collecting in a holding tank 7 the initial volume of cold water flowing from the filling line 6; and
e) opening the first valve 4 for delivering the hot water to the bathing facility 1.

The step c) further comprises the steps of:
c1) pressing a start button 12 for opening the second valve 5; and
c2) signaling a waiting period until the water level in the holding tank 7 reaches its maximum point.

The step d) further comprises the steps of:
d1) filling up the holding tank 7;
d2) detecting when the water level in the holding tank 7 reaches its maximum point;
d3) shutting off the second valve 5; and
d4) signaling that the bathing facility 1 is ready for delivering hot water.

The method further comprises the steps of:
f) shutting off the first valve 4 once the bath is finished; and
g) pumping back into the pipeline 3 the initial volume of cold water collected in the holding tank 7.

The step g) further comprises the steps of:

g1) providing a pump 16 driven by a motor 15 for pumping back into the pipeline 3 the initial volume of cold water collected in the holding tank 7 through a discharge line 21, wherein the discharge line 21 is provided with a check valve 19 for allowing the flow of the initial volume of cold water discharged by the pump 16 only in the direction in which the pump 16 discharges;

g2) displacing a remaining volume of hot water in the pipeline 3 with the initial volume of cold water discharged by the pump 16, causing said remaining volume of hot water in the pipeline 3 to enter at the top of the water heater 2; and g3) forcing a returning volume of water from the bottom of the water heater 2, equal to the remaining volume of water entering at the top water heater 2, to return through a supply pipeline 20 which allows supplying cold water to the bottom of the water heater 2.

The control of the step g) comprises the steps of:

e1) pressing a reset button 13 for starting a motor 15 driving a pump 16 for pumping back into the pipeline 3 the initial volume of cold water collected in the holding tank 7;

e2) signaling that the bathing facility 1 is not ready for delivering hot water;

e3) discharging the initial volume of cold water collected in the holding tank 7;

e4) detecting when the water level in the holding tank 7 reaches its minimum point;

e5) stopping the motor 15; and e6) signaling that the bathing facility 1 is ready for reinitiating the step c).

The various embodiments described herein are provided by way of illustration only and should not be construed to limit the scope of the present disclosure. Those skilled in the art will readily recognize various modifications and changes that may be made without following the example embodiments and applications illustrated and described herein, and without departing from the true spirit and scope of the disclosure.

What is claimed is:

1. An economizer system for saving heat and water, comprising:

a bathing facility for receiving hot water from a water heater through a pipeline;

a first valve for controlling the flow of hot water received by the bathing facility;

a second valve for allowing the flow of an initial volume of cold water existing in the pipeline between the water heater and the bathing facility through a filling line;

a holding tank for collecting the initial volume of cold water flowing from the filling line before the hot water is delivered to the bathing facility;

a pump driven by a motor for pumping back into the pipeline the initial volume of cold water collected in the holding tank through a discharge line, wherein the discharge line is provided with a check valve for allowing the flow of the initial volume of cold water discharged by the pump only in the direction in which the pump discharges; and a control box having a user interface comprising:

a start button for opening the second valve, allowing the flow of the initial volume of cold water through the filling line until the water level in the holding tank reaches its maximum point; and a reset button for starting the motor of the pump, allowing the discharge of the initial volume of cold water into the pipeline until the water level in the holding tank reaches its minimum point.

2. The economizer system of claim 1, wherein the control box further comprises:

a first pilot light for signaling a waiting period until the water level in the holding tank reaches its maximum point; and a second pilot light for signaling that the bathing facility is ready for delivering hot water.

3. The economizer system of claim 1, wherein the holding tank comprises:

a vent to the atmosphere;

a first sensor for detecting when the water level in the holding tank reaches its maximum point; and a second sensor for detecting when the water level in the holding tank reaches its minimum point.

4. The economizer system of claim 1, wherein the pipeline is formed by:

a first section extending from the water heater to a first bifurcation;

a second section extending from the first bifurcation to a second bifurcation; and a third section extending from the second bifurcation to the first valve.

5. The economizer system of claim 4, wherein the filling line is formed by:

a first part extending from the second bifurcation to the second valve; and a second part extending from the second valve to the holding tank.

6. The economizer system of claim 4, wherein the first section extends from the top of water heater, and wherein the economizer system further comprises a supply pipeline for supplying cold water to the bottom of the water heater.

7. A method for saving heat and water comprising:

a) providing a bathing facility for receiving hot water from a water heater through a pipeline;

b) having a first valve for controlling the flow of hot water received by the bathing facility shut off;

c) opening a second valve for allowing the flow of an initial volume of cold water existing in the pipeline between the water heater and the bathing facility through a filling line;

d) collecting in a holding tank the initial volume of cold water flowing from the filling line; and e) opening the first valve for delivering the hot water to the bathing facility, wherein step c) further comprises:

c1) pressing a start button for opening the second valve; and c2) signaling a waiting period until the water level in the holding tank reaches its maximum point.

8. The method of claim 7, wherein step d) further comprises:

d1) filling up the holding tank;

d2) detecting when the water level in the holding tank reaches its maximum point;

d3) shutting off the second valve; and d4) signaling that the bathing facility is ready for delivering hot water.

9. The method of claim 7, further comprising:

f) shutting off the first valve once the bath is finished; and g) pumping back into the pipeline the initial volume of cold water collected in the holding tank.

10. The method of claim 9, wherein step g) further comprises:
- g1) providing a pump driven by a motor for pumping back into the pipeline the initial volume of cold water collected in the holding tank through a discharge line, wherein the discharge line is provided with a check valve for allowing the flow of the initial volume of cold water discharged by the pump only in the direction in which the pump discharges;
- g2) displacing a remaining volume of hot water in the pipeline with the initial volume of cold water discharged by the pump, causing said remaining volume of hot water in the pipeline to enter at the top of the water heater; and
- g3) forcing a returning volume of water from the bottom of the water heater, equal to the remaining volume of water entering at the top water heater, to return through a supply pipeline which allows supplying cold water to the bottom of the water heater.

11. The method of claim 9, wherein the control of step g) comprises:
- e1) pressing a reset button for starting a motor driving a pump for pumping back into the pipeline the initial volume of cold water collected in the holding tank;
- e2) signaling that the bathing facility is not ready for delivering hot water;
- e3) discharging the initial volume of cold water collected in the holding tank;
- e4) detecting when the water level in the holding tank reaches its minimum point;
- e5) stopping the motor; and
- e6) signaling that the bathing facility is ready for reinitiating the step c).

12. A method for saving heat and water comprising:
- a) providing a bathing facility for receiving hot water from a water heater through a pipeline;
- b) having a first valve for controlling the flow of hot water received by the bathing facility shut off;
- c) opening a second valve for allowing the flow of an initial volume of cold water existing in the pipeline between the water heater and the bathing facility through a filling line;
- d) collecting in a holding tank the initial volume of cold water flowing from the filling line by:
  - d1) filling up the holding tank;
  - d2) detecting when the water level in the holding tank reaches its maximum point;
  - d3) shutting off the second valve; and
  - d4) signaling that the bathing facility is ready for delivering hot water; and
- e) opening the first valve for delivering the hot water to the bathing facility.

13. The method of claim 12, further comprising:
- f) shutting off the first valve once the bath is finished; and
- g) pumping back into the pipeline the initial volume of cold water collected in the holding tank.

14. The method of claim 13, wherein step g) further comprises:
- g1) providing a pump driven by a motor for pumping back into the pipeline the initial volume of cold water collected in the holding tank through a discharge line, wherein the discharge line is provided with a check valve for allowing the flow of the initial volume of cold water discharged by the pump only in the direction in which the pump discharges;
- g2) displacing a remaining volume of hot water in the pipeline with the initial volume of cold water discharged by the pump, causing said remaining volume of hot water in the pipeline to enter at the top of the water heater; and
- g3) forcing a returning volume of water from the bottom of the water heater, equal to the remaining volume of water entering at the top water heater, to return through a supply pipeline which allows supplying cold water to the bottom of the water heater.

15. The method of claim 13, wherein the control of step g) comprises:
- e1) pressing a reset button for starting a motor driving a pump for pumping back into the pipeline the initial volume of cold water collected in the holding tank;
- e2) signaling that the bathing facility is not ready for delivering hot water;
- e3) discharging the initial volume of cold water collected in the holding tank;
- e4) detecting when the water level in the holding tank reaches its minimum point;
- e5) stopping the motor; and
- e6) signaling that the bathing facility is ready for reinitiating the step c).

16. An economizer system for saving heat and water, comprising:
- a bathing facility for receiving hot water from a water heater through a pipeline;
- a first valve for controlling the flow of hot water received by the bathing facility;
- a second valve for allowing the flow of an initial volume of cold water existing in the pipeline between the water heater and the bathing facility through a filling line;
- a holding tank for collecting the initial volume of cold water flowing from the filling line before the hot water is delivered to the bathing facility; and
- a pump driven by a motor for pumping back into the pipeline the initial volume of cold water collected in the holding tank through a discharge line, wherein the discharge line is provided with a check valve for allowing the flow of the initial volume of cold water discharged by the pump only in the direction in which the pump discharges, wherein the discharge line is formed by:
  - a first segment extending from the holding tank to the pump;
  - a second segment extending from the pump to the check valve; and
  - a third segment extending from the check valve to the first bifurcation, wherein the pipeline is formed by:
- a first section extending from the water heater to a first bifurcation;
- a second section extending from the first bifurcation to a second bifurcation; and
- a third section extending from the second bifurcation to the first valve.

* * * * *